W. F. HOSFORD.
PROCESS OF FORMING ELECTRICAL CONTACTS.
APPLICATION FILED MAR. 23, 1917.

1,309,523.

Patented July 8, 1919.
12 SHEETS—SHEET 1.

Inventor
William F. Hosford
By [signature]
Atty.

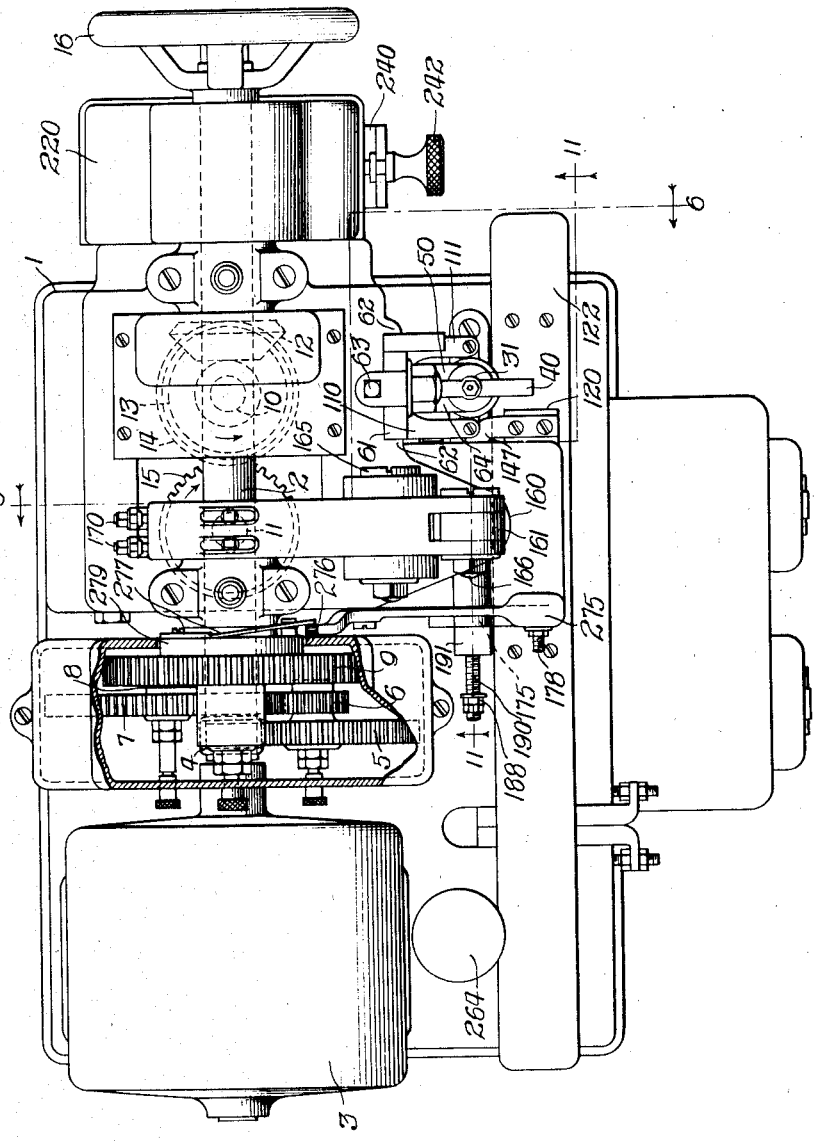

W. F. HOSFORD.
PROCESS OF FORMING ELECTRICAL CONTACTS.
APPLICATION FILED MAR. 23, 1917.

1,309,523.

Patented July 8, 1919.
12 SHEETS—SHEET 3.

Inventor
William F. Hosford
By George Bayard Jones,
Atty.

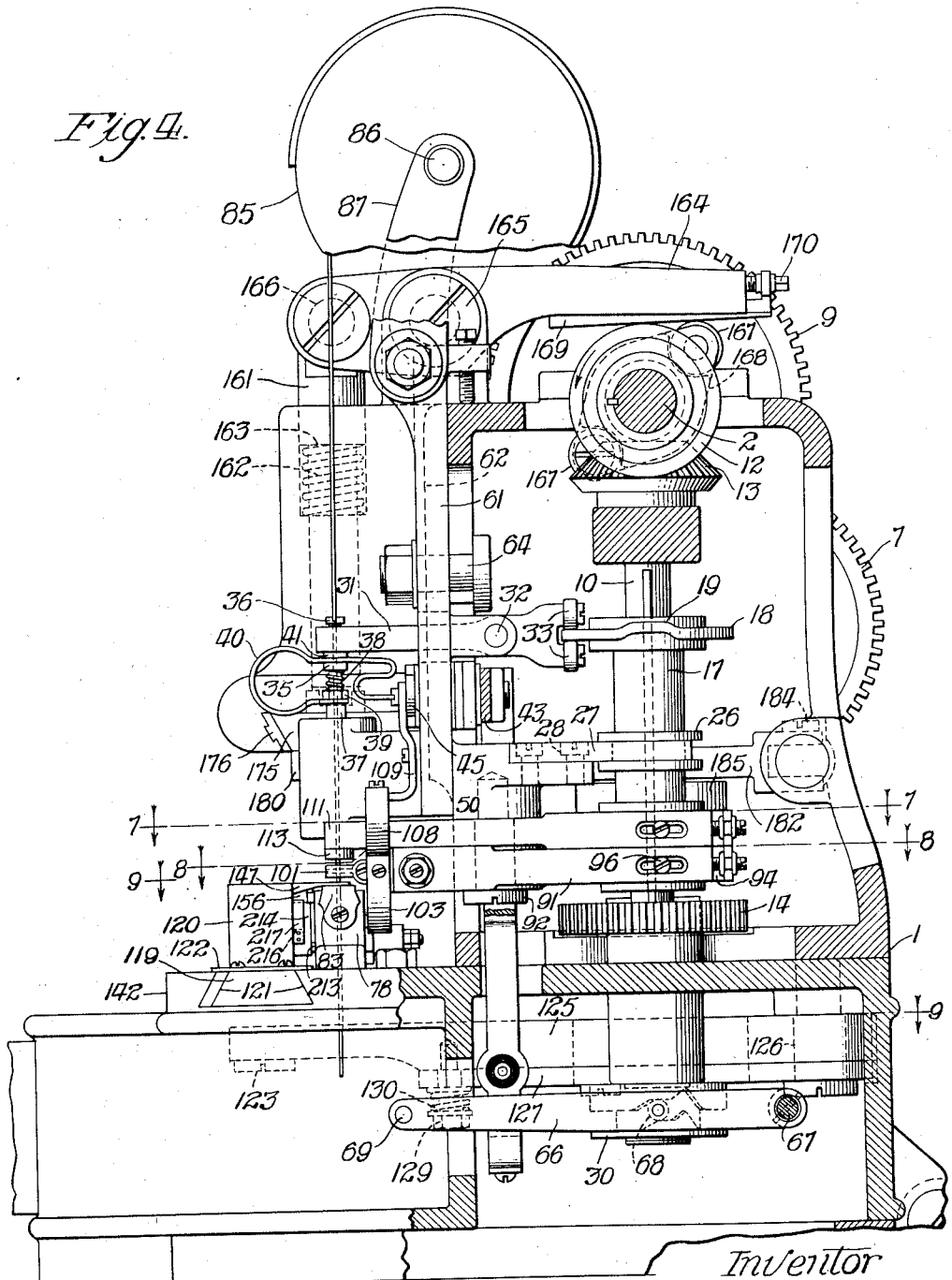

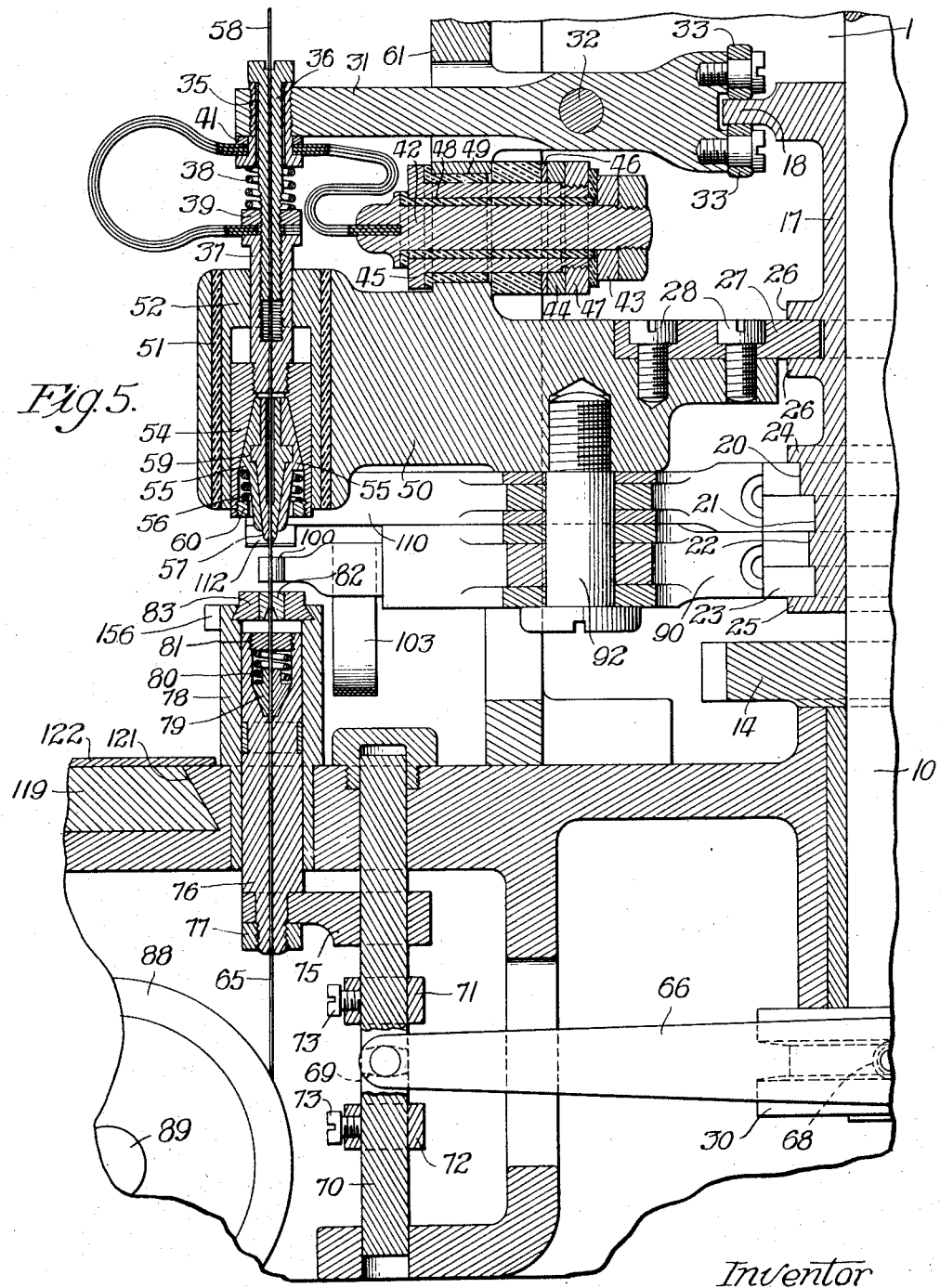

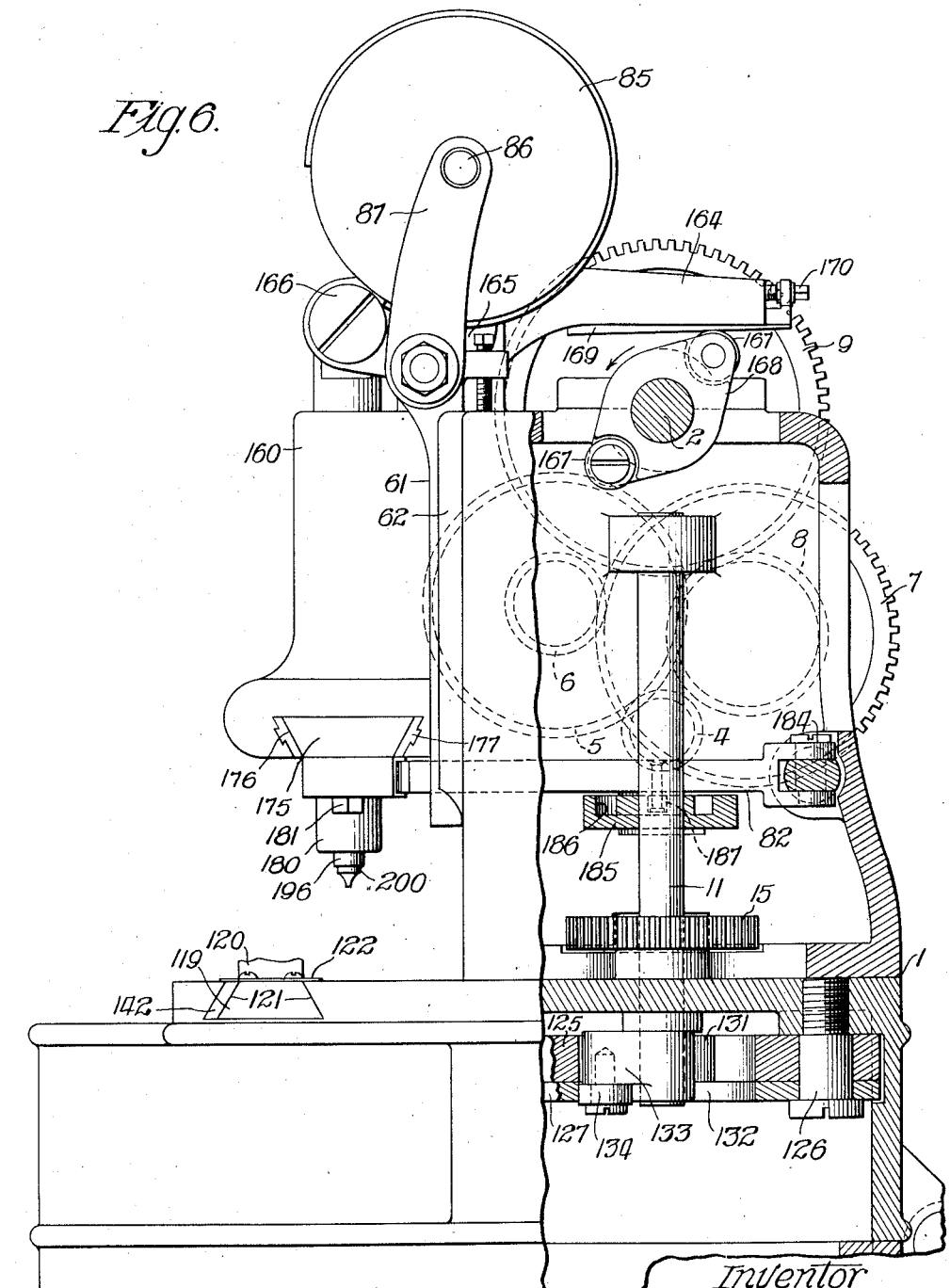

W. F. HOSFORD.
PROCESS OF FORMING ELECTRICAL CONTACTS.
APPLICATION FILED MAR. 23, 1917.

1,309,523.

Patented July 8, 1919.
12 SHEETS—SHEET 7.

Inventor
William F. Hosford
By George Bayard Jones
Atty.

W. F. HOSFORD.
PROCESS OF FORMING ELECTRICAL CONTACTS.
APPLICATION FILED MAR. 23, 1917.
1,309,523.
Patented July 8, 1919.
12 SHEETS—SHEET 8.
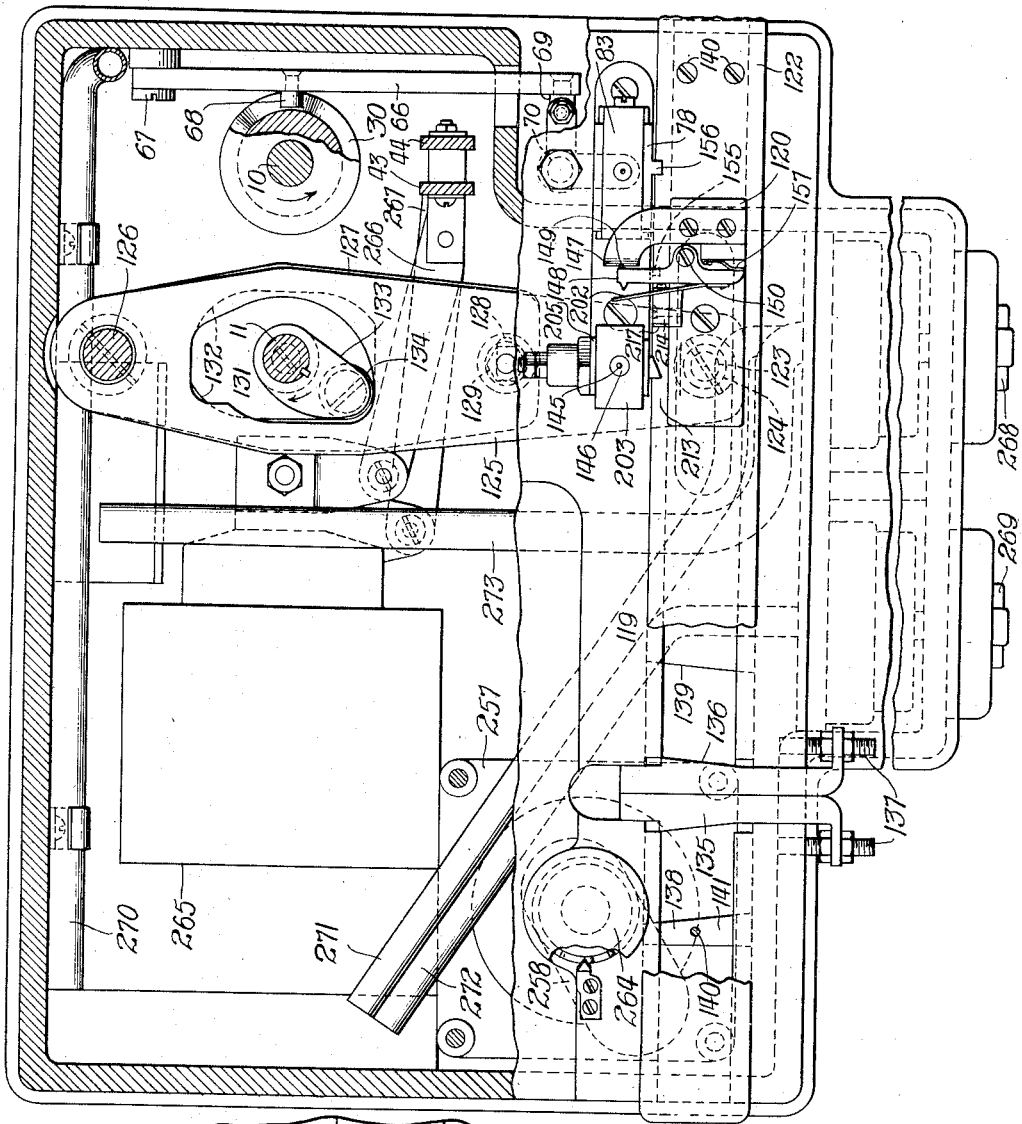
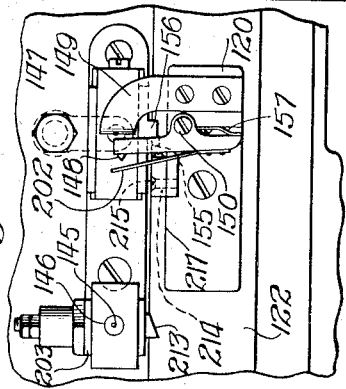
Inventor
William F. Hosford
By George Bayard Jones
Atty.

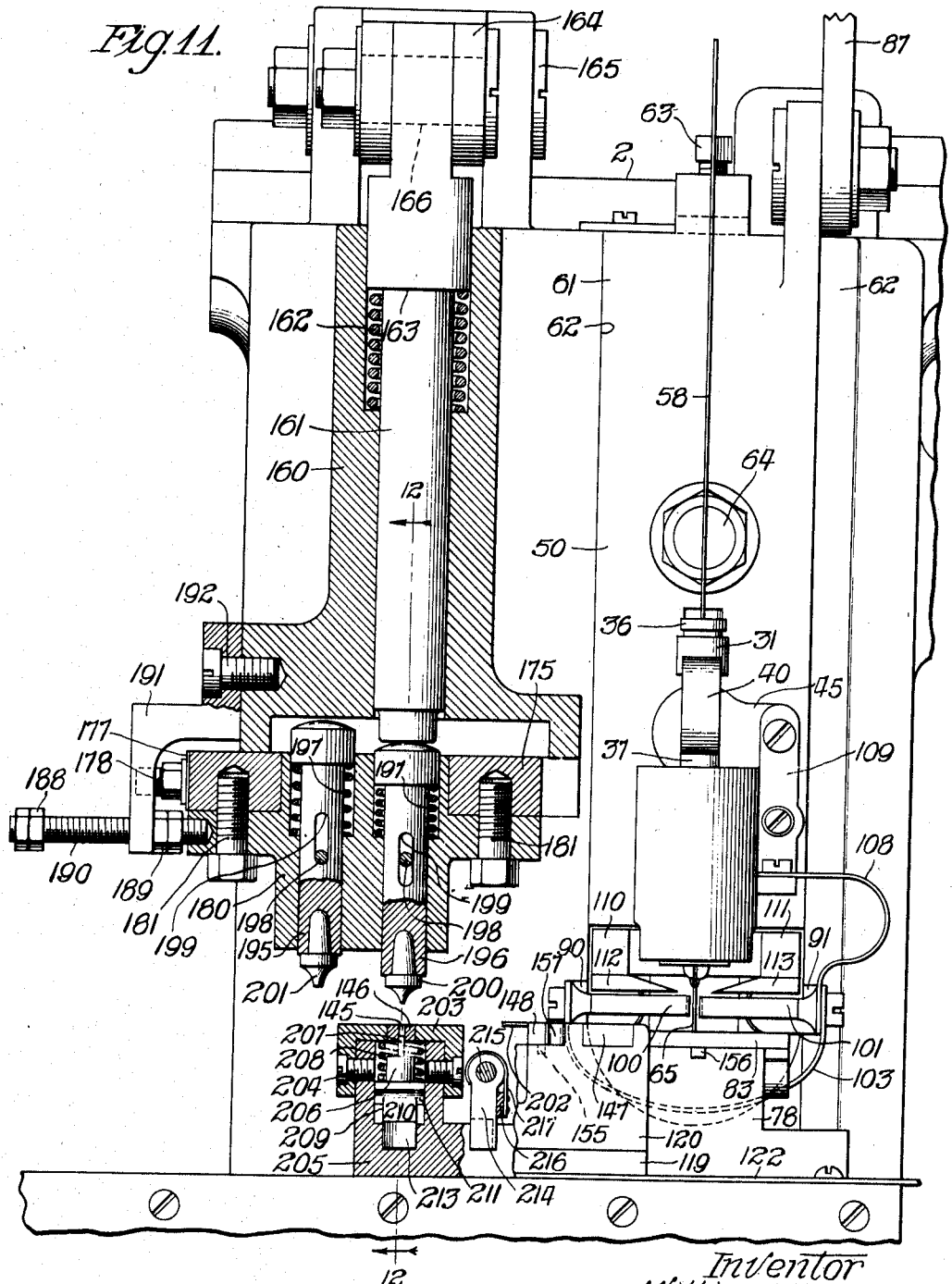

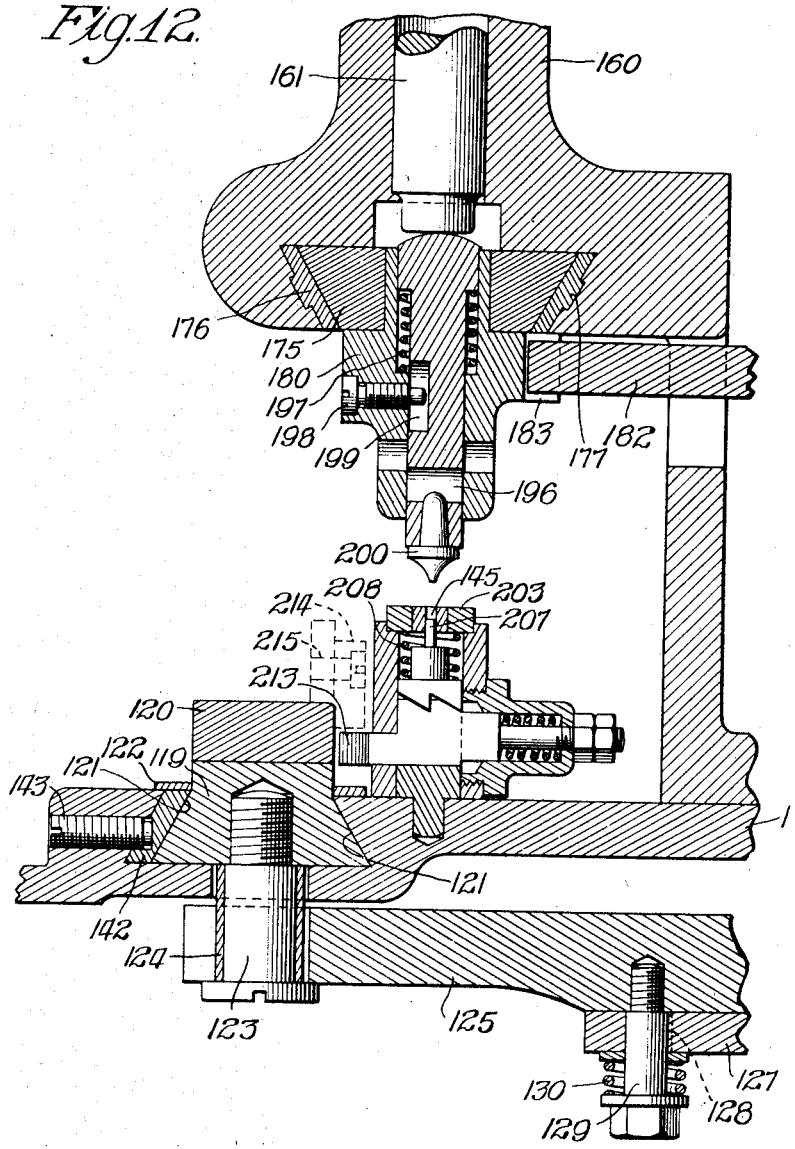

W. F. HOSFORD.
PROCESS OF FORMING ELECTRICAL CONTACTS.
APPLICATION FILED MAR. 23, 1917.

1,309,523.

Patented July 8, 1919.

Inventor
William F. Hosford
By George Bayard Jones,
Atty.

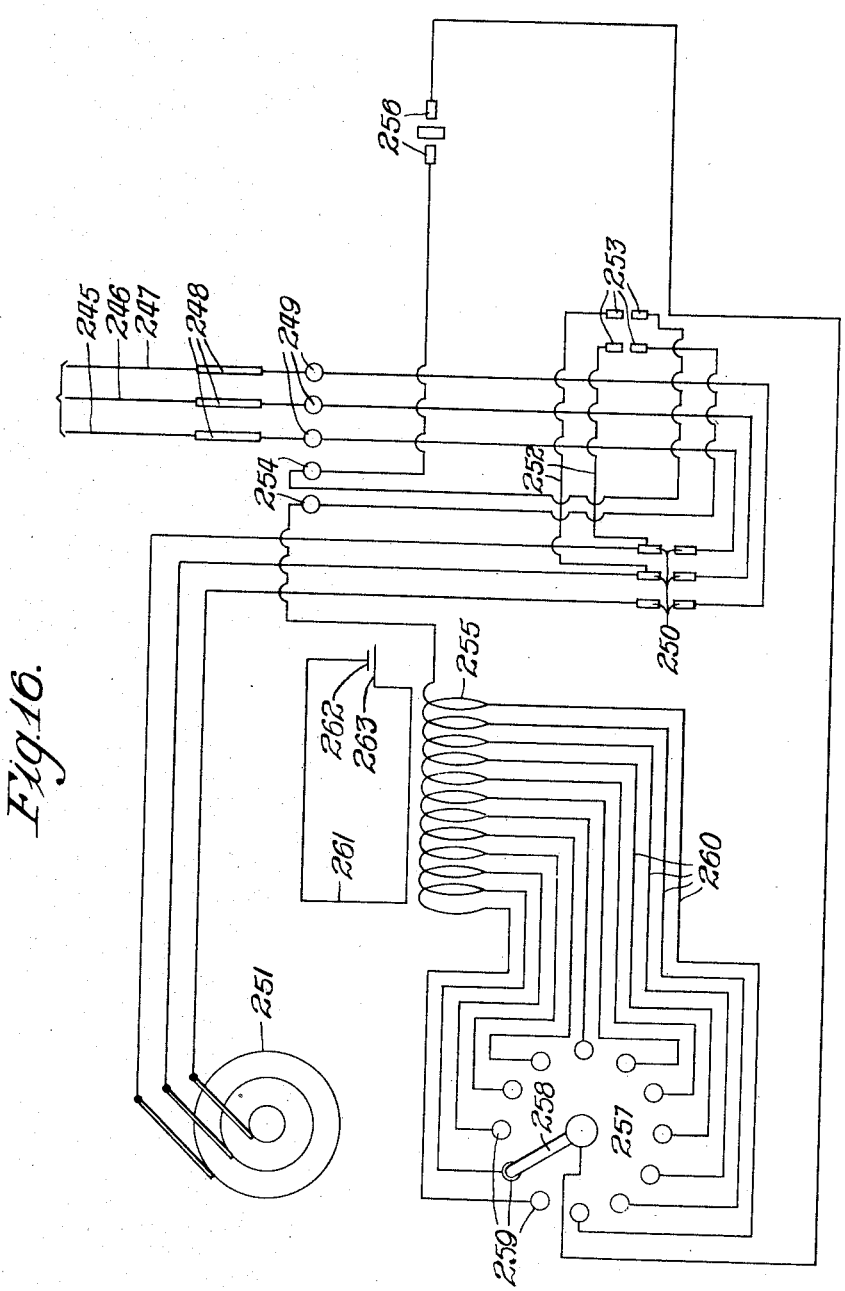

UNITED STATES PATENT OFFICE.

WILLIAM F. HOSFORD, OF OAK PARK, ILLINOIS, ASSIGNOR TO WESTERN ELECTRIC COMPANY, INCORPORATED, OF NEW YORK, N. Y., A CORPORATION OF NEW YORK.

PROCESS OF FORMING ELECTRICAL CONTACTS.

1,309,523.  Specification of Letters Patent.  Patented July 8, 1919.

Original application filed September 24, 1915, Serial No. 52,514. Divided and this application filed March 23, 1917. Serial No. 156,966.

*To all whom it may concern:*

Be it known that I, WILLIAM F. HOSFORD, a citizen of the United States, residing at Oak Park, in the county of Cook and State of Illinois, have invented new and useful Improvements in Processes of Forming Electrical Contacts, of which the following is a full, clear, concise, and exact description, reference being had to the accompanying drawings, forming a part of this specification.

This invention relates to a process of electrically welding contacts or the like, as for example, welding platinum contact heads to a shank or other support, forming rivets or studs to be used particularly with switch contact springs and analogous devices.

The present application is a division of my co-pending application, Serial Number 52,514, filed September 24, 1915.

The invention contemplates a sequence of operations in which the ends of two wires, one of platinum or other material suitable for electrical contacts, and the other of less expensive conducting material, are pressed against each other and the abutting ends welded together by the passage of an electric current through the adjacent ends of said wires. Both wires are then cut, the platinum wire being cut very short and the other wire, which may be of German silver, for example, being cut somewhat longer to form a shank with a platinum tip, which tip, as a further and final step in the sequence of operations, may be shaped to give it a conical point, a flat disk shape, or any other desired form.

A machine suitable for carrying out the process is illustrated in the accompanying drawings:

Fig. 2 is a plan view thereof, with certain parts removed for the sake of clearness;

Fig. 3 is an end elevation of the machine;

Fig. 4 is a section on the line 4—4 of Fig. 1;

Fig. 5 is a section on the line 5—5 of Fig. 1;

Fig. 6 is a half elevation and half section on the line 6—6 of Fig. 2;

Fig. 9 is a section taken on the line 9—9 of Fig. 4;

Fig. 10 is a plan view of the carriage in its initial position;

Fig. 11 is a front elevation of the welding and heading mechanism, the latter being shown partially in section;

Fig. 12 is an enlarged sectional elevation of the heading mechanism in a plane at right angles to the section in Fig. 11;

Fig. 16 is a diagram of the circuit connections;

Figure 17:
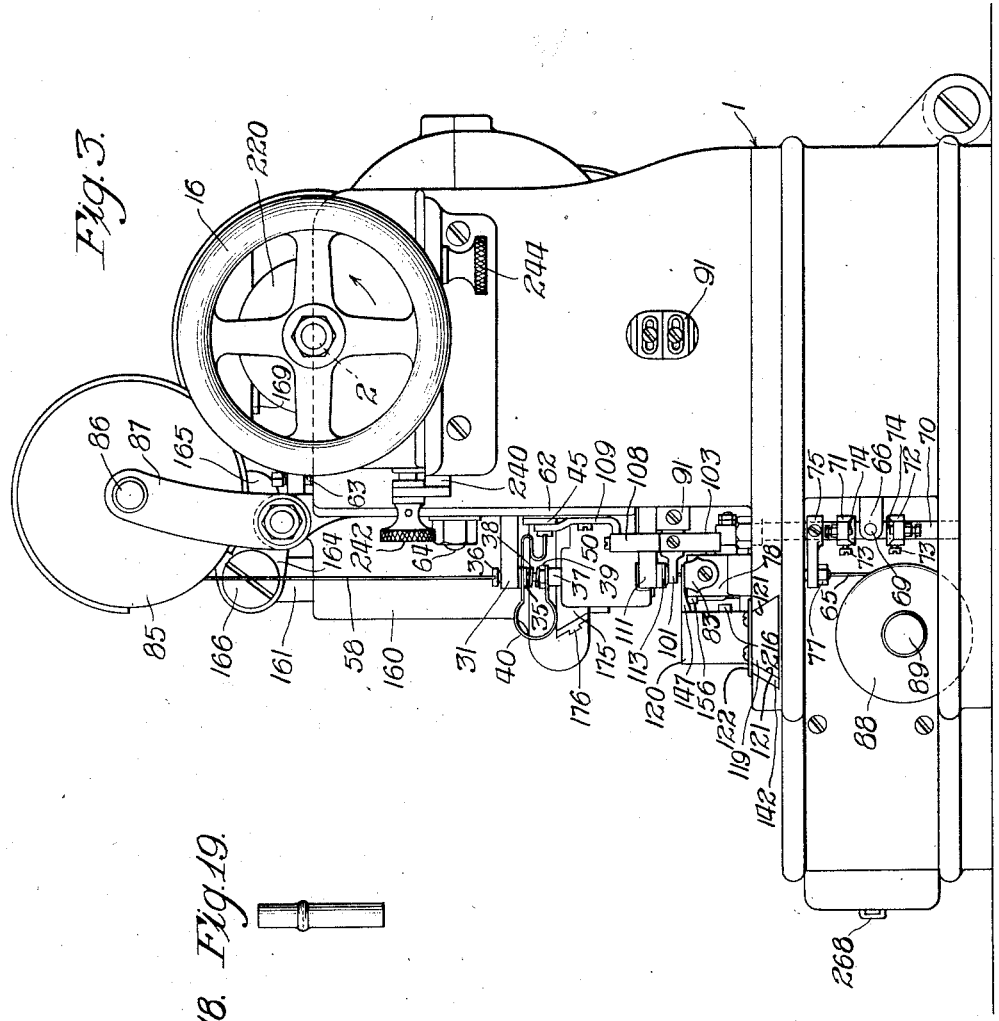
Figure 18:
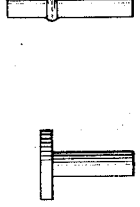
Figure 19:
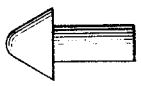

Figs. 17, 18, and 19 are elevations on a large scale of various types of composite contacts which may be made by the machine.

The various parts of the machine are supported in a suitable frame or standard, the base of which is indicated by reference 1. The main shaft 2, from which the various parts are driven, is arranged horizontally near the top of the machine. It may be driven from any suitable source of power. For this purpose an electric motor 3 is provided, which is mounted on the frame of the machine and which drives said main shaft through suitable reduction gearing 4, 5, 6, 7, 8, and 9. A clutch, hereinafter described, may also be provided, whereby the machine stops after each complete cycle until started by the operator. The main shaft 2 drives a pair of vertical shafts 10, 11. These shafts have various cams mounted thereon, which control the cycle of operations of the machine. The shaft 10 is driven from the shaft 2 through beveled gears 12, 13. The shaft 11 is driven from the shaft 10 by gears 14, 15, mounted on the respective shafts. The main shaft 2 is provided with a hand wheel 16, whereby the machine may be operated slowly by hand when inspecting it or adjusting it.

As seen in Figs. 4 and 5, the vertical shaft 10 is provided with a sleeve 17 having a spline connection, whereby it rotates therewith but may slide thereon to adjust it vertically. Said sleeve carries a cam 18 at its upper end in the form of a radial flange with an offset portion 19. It also carries further cams 20, 21, 22, 23 located between collars 24, 25. It is provided at an intermediate portion with a pair of collars 26, which receive between them a steel supporting plate 27, secured by screws 28 to a vertically adjustable frame, hereinafter described. The position of the sleeve vertically is determined by this supporting plate. At the lower end of the shaft a two-faced cam 30 is located. The upper cam 18 and the lower cam 30 rock upper and lower arms respectively, by means of which two chucks are made to approach and recede from each other, to feed the platinum and German silver wires toward each other.

The upper arm 31 is pivoted about the pin 32 and is provided with a pair of rollers 33 which engage opposite sides of the flange 18. Said arm has an opening near its free end within which a screw-threaded sleeve 35 is received, said sleeve surrounding a stud 36 which slides freely therethrough, said stud being screwed into a second sleeve 37 at its lower end. Said sleeve is normally impelled downwardly by means of a spring 38 which bears at its upper end against the upper sleeve 35 and at its lower end against a nut 39. A flexible conductor 40 is clamped at an intermediate portion between the lower end of the sleeve 35 and a washer 41. Good electrical contact is thus made with the foregoing parts, the other end of the flexible conductor being connected to a terminal member 42 to which a bus bar 43 is clamped. A second bus bar 44 is also provided which makes contact with a second terminal member 45 and is clamped thereto between a washer 46 and a nut 47, the second terminal member being in the form of a sleeve concentric with and separated from the first terminal member. It is insulated therefrom and from the frame of the machine by suitable insulation 48, 49.

The chuck as a whole is slidably mounted in an opening in a vertically adjustable frame 50, said opening having a liner 51 of insulation which incloses a cylinder 52. The lower end of the sleeve 37 is secured in a cylindrical block 54 constituting the body of the chuck and arranged to slide up and down within said cylinder. A plurality of jaws 55 fit within a conical recess within said block 54 and are normally impelled upwardly by a spring 56, whereby they grip a plurality of inner copper jaws 57, causing the latter to grip the platinum wire 58 and make good contact therewith. Said inner jaws are locked in place within said outer jaws by means of a circumferential shoulder 59, but are removable to permit replacement if burnt out. The jaws and the spring are prevented from dropping from the block 54 by means of a ring 60 screwed into the open end thereof. Assuming that the lower end of the platinum wire 58 is held against upward movement, it will be seen that when the chuck is lifted by the pivoted arm 31, the jaws thereof slide upwardly along the wire 58, the friction between the wire and said jaws serving to unseat the latter from their conical seat against the action of the spring 56. When the chuck is moved downwardly, however, the jaws grip the wire and advance it. The spring 38 constitutes yielding means, whereby the downward movement of the chuck may be stopped somewhat prior to the downward limit of movement of the pivoted arm 31 without injuring the apparatus, and insures pressure on the abutting ends of the wires.

The entire frame 50, supporting the upper chuck, is adjustable vertically to vary the amount of platinum in the head and also the length of the German silver shank. As shown in Figs. 2 and 4, the frame 50 has a narrow portion 61 which slides between parallel flanges 62 constituting part of the main frame. The frame 50 is adjusted vertically by means of a stud 63 at the upper end thereof. Said frame is clamped in adjusted position by means of a bolt 64. It will be seen that when the frame 50 is adjusted vertically, the upper chuck and associated parts are carried with it, as well as the jaws, the nippers, their associated parts and the sleeve 17 carrying the various cams. The movement of said sleeve is effected by virtue of the plate 27 received between the collars 26, as previously explained.

The German silver wire 65 is fed upwardly in a manner quite similar to that above described. The details of the chuck, however, are somewhat different, the inner copper jaws being omitted. The cam 30 at the lower end of the shaft 10 rocks the arm 66 up and down. Said arm is pivoted about the pin 67 and carries a roller 68, which rides in the groove of the cam 30. At its outer end it carries a pin 69, which causes the up and down reciprocation of the rod 70. Said rod is provided with a pair of collars 71, 72, each secured thereto by a stud 73 and each carrying an additional stud 74, said studs constituting upper and lower adjustable stops which are engaged by the pin 69 on the arm 66. The rod 70 is thus raised and lowered toward the end of the movement of the pin 69. A coarse adjustment of its movement is obtained through the collars 71, 72, and a fine adjustment through the studs 74. The rod 70 carries an arm 75, which raises and lowers the chuck member 76, being secured to the lower end thereof by means of a nut 77. Said chuck member slides within a block 78 and has a conical seat in an opening at its upper end within which a plurality of jaws 79 are normally seated by means of a spring 80. The spring bears also against a disk 81 which closes said opening. Assuming the German silver wire to be held against downward movement, it will be seen that when the chuck moves downwardly the jaws slip along the wire, but when it moves upwardly, they advance the wire. Said wire passes through an accurately formed opening in a hard steel plate or die 82, forced into a support 83, dovetailed into the upper end of the block 78. The platinum wire is carried on a suitable reel or spool 85, mounted to turn freely on a stud 86, supported by an arm 87. The German silver wire is mounted on a spool 88, supported on a stud 89 in the lower part of the machine. The operation of the machine is such that the ends of the wire are first welded together and the parts thus welded are cut off from the respective wires, forming a composite number, the lower part of which consists of a short length of German silver wire with a tip or head of platinum integrally united thereto. The diameter of the two wires may be the same or either may be larger than the other. In forming a rivet, such as shown in Fig. 17, the platinum wire may be of somewhat greater diameter than the German silver wire, although since the platinum tip is upset and formed into a head, this need not necessarily be the case. For certain purposes the wires may be of the same diameter as shown in Fig. 19, and no head formed at all.

Figures 7, 8:
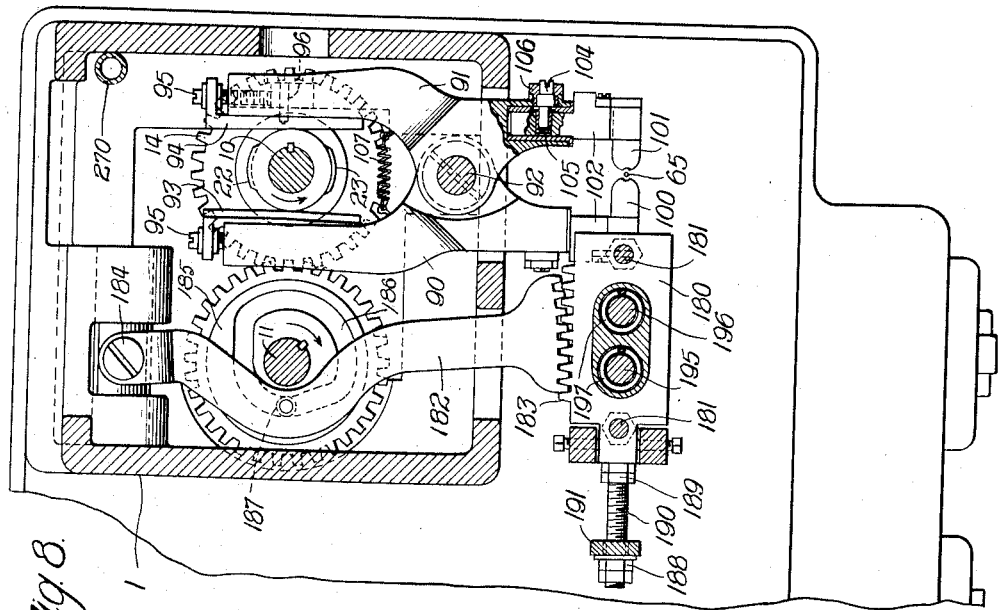
Fig. 7 is a section on the line 7—7 of Fig. 4.
Fig. 8 is a section on the line 8—8 of Fig. 4.

The means for holding the German silver wire during the brief interval that the platinum wire is being welded to it, constituting also the means for establishing the welding circuit, will now be described (Fig. 8). A pair of levers 90, 91 are pivotally mounted on a stud 92. In order to insure a hard, smooth surface at the rear ends against which the cams 22, 23 may slide, L-shaped members 93, 94 are provided, which diverge slightly. These members slide longitudinally in suitable ways, and each may be adjusted by a screw 95 whereby the proper distance between them may be arrived at. Said members are locked in their position of adjustment by means of screws 96, which travel therewith and slide in suitable slots. The copper clamps 100, 101 are carried at the free ends of said levers in suitable carriers 102 to which the flexible conductor 103 is connected, whereby the circuit may be completed through said jaws. The carriers 102 are adjustably secured within openings at the outer ends of the levers 90, 91, the adjustment being effected in each case by means of an eccentric stud 104, the inner end of which turns in a bushing 105 and the outer end of which turns in a suitable sleeve 106, which is screwed into an opening in the lever. The clamps are brought together once during each revolution of the shaft 10 by means of the cams 22, 23. These cams are identical in outline and are superimposed, but are arranged 180 degrees apart. Each cam coöperates with one of the members 93, 94 but not with the other, one of said members being arranged somewhat higher than the other to permit this operation. The clamps are normally held apart by a spring 107 which draws the levers 90, 91 together, and they may be removed from their carriers to replace them.

During the welding operation, the upper chuck grips the wire tighter than the lower chuck in order to insure good electrical contact therewith. The lower chuck is not relied on for making electrical contact, as the copper clamps 100, 101 perform this function, the circuit being completed through the conductors 103, 108 and 109 to the terminal member 45 and bus bar 44.

After the welding operation has taken place, the platinum wire is cut off just above the weld by means of suitable nippers actuated by mechanism which will now be described (Fig. 7). Directly above the pair of pivoted levers which operate the clamping members is a second pair of levers 110, 111 mounted on the same stud 92. The rear ends of said levers are provided with adjustable members similar to those previously described, and they are moved apart by the rotation of the cams 20, 21, which are mounted 180 degrees apart, similarly to the cams 22, 23. The forward ends carry the knife blades 112, 113, which meet momentarily, thus cutting the wire after the welding has been completed. The blades are normally held apart by means of a spring 114.

The operation of the machine is such that just prior to the cutting off of the platinum wire, the upper chuck is raised, enabling the jaws thereof to take a new grip on the wire, whereby when said chuck is subsequently lowered, a new length of wire is presented for the welding operation. During this upward movement of the chuck, the clamps 100, 101 retain their hold on the German silver wire in order to resist the upward pull, and hold the platinum wire down while the jaws slip upwardly along it. After the chuck has moved upwardly, the nippers cut off the platinum wire in the manner previously described. While the jaws still grip the wire, the lower chuck begins to descend, sliding along said wire preparatory to taking a new grip thereon. Before said chuck has completed its descent, however, said jaws release their grip on the end of the German silver wire which carries the platinum tip, said wire being drawn down a small amount, just enough so that said tip clears the under side of said clamps with enough of the German silver projecting through the opening in the die to provide a shank of the desired length.

Figure 1:
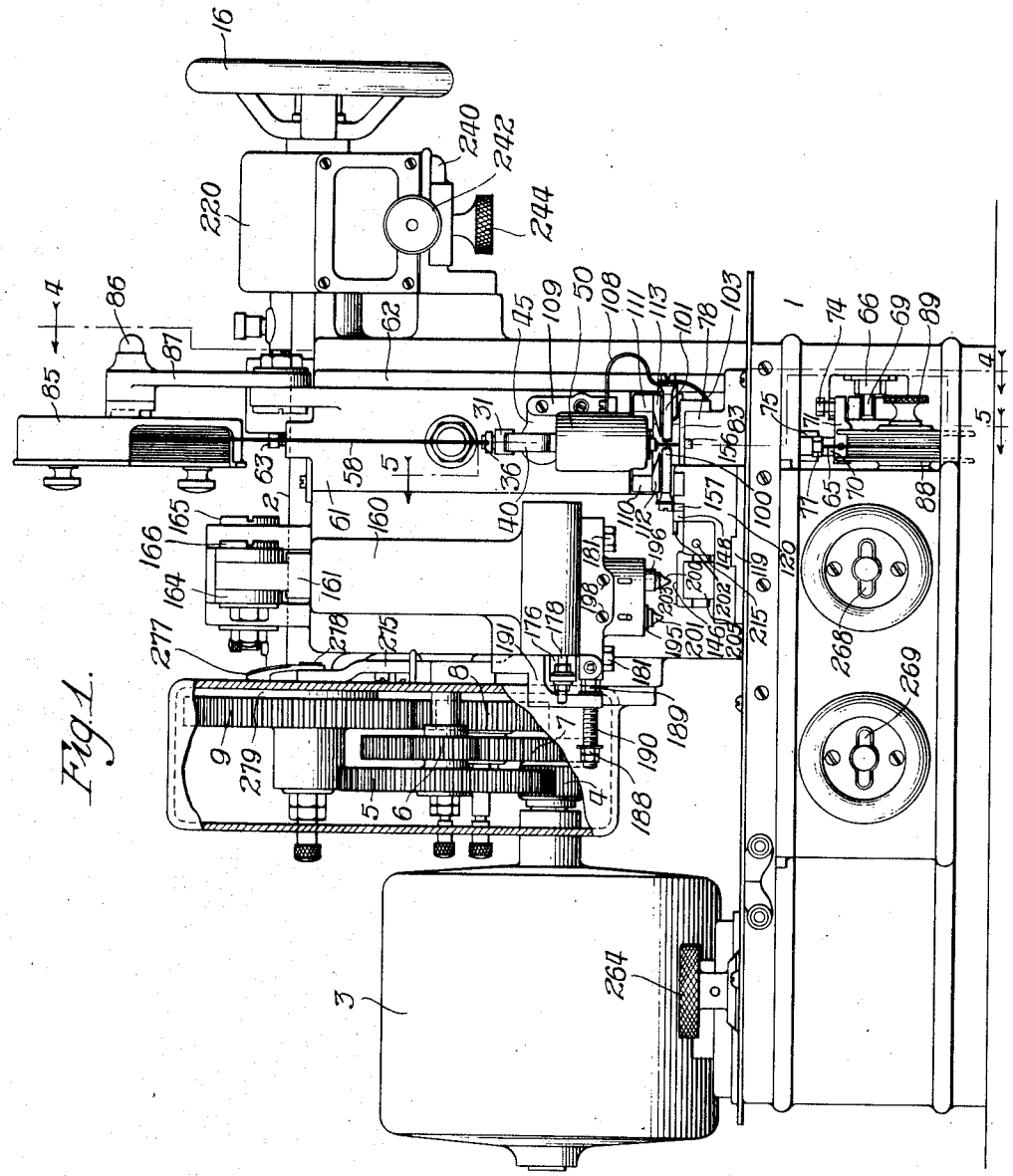
Figure 1 is a front elevation, partly in section, of said machine.

As the next step of the operation, the German silver wire is sheared off, and the small partially completed rivet thus formed is moved by a traveling carriage beneath a pair of hammers which shape up the head to the desired form. The carriage, which includes the shearing mechanism, will now be described. It consists of a bar of metal 119 having a superimposed block 120 and sliding in suitable ways 121, extending transversely across the front of the machine. A cover plate 122 is secured thereto and extends the entire width of the machine as shown in Figs. 1 and 2, thereby covering the opening between said ways. The carriage is moved back and forth by means of a stud 123 screwed into the bar 119 as shown in Fig. 12, said stud being surrounded by a sleeve or roller 124 and reciprocated by an arm 125, having at its outer end a slot within which the roller is received, and being pivotally mounted at its other end on the stud 126. The arm 125 is caused to rock about its pivot by a positive driving mechanism during part of its movement only, most of its motion being derived from a second arm 127 also pivotally mounted on the same stud 126 and having frictional engagement with said first arm, whereby one may drive the other frictionally but permit a certain slip if necessary. The connection for this purpose consists of a slot 128 in the outer end of the pivoted arm 127 through which a stud 129 passes. A spring 130 which surrounds said stud causes the arm 127 to press upwardly against the arm 125. Both arms are provided with openings 131, 132 through which the vertical shaft 11 passes, the wall of the opening constituting cam surfaces. An arm 133 is mounted to turn with the shaft 11 and carries a roller 134 at its outer end, which roller rides along the wall of the opening 132, thereby imparting the desired back and forth movement to the arm 127 and thence to the arm 125 and to the carriage. The arm 133 engages the wall of the opening 131 at one point in its rotation, thereby positively driving the arm 125 at the time when the carriage begins its travel, to provide for the shearing of the German silver wire. As will hereafter be apparent, it is desirable to confine the travel of the carriage to very accurate limits, and for this reason the travel is not determined simply by the back and forth movement of the arm 127, but the lost motion mechanism just described is provided in conjunction with a pair of positive stops which may be accurately adjusted. Said stops 135, 136 (Fig. 9) have inclined faces and are adjustable from front to rear by means of screws 137. Said stops are engaged by the corresponding inclined faces 138, 139 of blocks secured to the sliding cover plate 122 by means of screws 140. One of said blocks constitutes the main body of the carriage, 119, the other block 141 being in alinement therewith. The travel of the carriage under the influence of the arm 127 would ordinarily be slightly greater than the limits determined by said stops, as a result of which the arm 127 slides over the arm 125 a small amount during the back and forth reciprocation. To take up wear, one side of the ways is formed by an adjustable bar 142 which may be moved rearwardly by screws 143.

The object of accurately limiting the travel of the carriage is to permit the rivet to be carried from the point where it is welded to a small hole 145, in what may be termed an anvil 146, into which hole it is thereafter pushed and held while the head is being shaped up. It is therefore essential to stop it exactly over said holes. During the traveling movement, the rivet is yieldingly held between two members 147, 148. The member 147 is a tool steel arm secured to the top of the block. Its lower edge constitutes a shearing knife and its vertical face is provided with a vertical recess 149, within which recess the rivet is yieldingly held by the arm 148 which is pivoted to the block 120 about the stud 150. At the time the rivet is welded, the members 147, 148 are on opposite sides of said rivet, and are spread apart slightly so as not to interfere with said operation. (See Fig. 10). They are held apart by a downward projection 155 on the arm 148 which engages a stationary projection 156 during the travel of the carriage to the right, whereupon said members are held apart against the action of the spring 157. (See Fig. 11). As soon as the carriage starts to the left, being positively driven at this point, the arm 147 shears off the German silver wire, and simultaneously the shank of the rivet is seized between the members 147, 148 which come together, hold it in the recess 149, and carry it to a point exactly above the hole 145 in the anvil, into which hole it is immediately pushed, as hereinafter described. (See Figs. 11 and 12.)

The mechanism for shaping the rivet head will now be described. Within a vertical opening in a part 160 of the main frame of the machine, a plunger 161 is mounted which is normally held in uppermost position by means of a spring 162 which bears against a shoulder 163 thereon. Said plunger is moved downward intermittently, however, by means of a pivoted arm 164 by which it is carried. Said arm is mounted to turn about the stud 165, and at one end supports the plunger by means of a stud 166, the other end being engaged by a pair of rollers 167 mounted on opposite sides of a suitable arm 168 fast to the main shaft 2. In order to accurately adjust the movement of the arm 164 and to provide for more of a throw when one roller strikes it than when the other roller strikes it, a pair of adjustable devices 169, 170 are provided, similar to those previously described, each of which is engaged by one roller only.

As the plunger 161 moves downwardly, it depresses either of two tool holders arranged directly beneath it and mounted in a carriage, whereby one or the other of said tool holders may be brought into position beneath said plunger in alinement therewith. The carriage, as seen in Figs. 11 and 12, consists of a block of metal 175 which slides in ways made up of adjustable wedges 176, 177. See also Fig. 7. These wedges are adjustable by means of screws 178, whereby they may be moved longitudinally with their inner surfaces always parallel. This adjustment permits the carriage as a whole to be adjusted to the front or rear a very small amount. In addition to the block 175, the carriage consists of a lower block 180 secured thereto by studs 181. The carriage as a whole (see Fig. 8) is made to reciprocate by means of a segmental rack 182, the teeth of which engage teeth 183 formed in said lower block 180. The arm 182 is pivoted about a stud 184. It is reciprocated by a cam consisting of a disk 185 which turns with the shaft 11 and has a cam groove 186 therein, which receives a roller 187 carried by said arm 182. As the shaft turns, the carriage is reciprocated, any overthrow being prevented by positive stops in the form of nuts 188, 189 on a screwthreaded rod 190 projecting from the lower block 180, which nuts engage the sides of a bracket 191 secured by a screw 192 to the main frame.

The lower block 180 has two openings therethrough within which the tool holders 195, 196 are mounted, the latter being normally held in uppermost position by means of suitable springs 197, longitudinal movement thereof being limited by pins 198 which project through slots 199. The lower end of each holder is recessed to receive a tool, by means of which the head of the rivet may be given the desired configuration. In the present case, the first tool 200 is arranged to press down the platinum head and widen it or upset it. The carriage is then moved to bring the second holder 195 in alinement with the plunger 161, whereupon the second tool 201 is pressed down against the previously formed head and gives it a rounded top resembling a rivet head. The extent of the downward movement of the tools may be independently adjusted. As the first tool pushes the rivet into the hole in the anvil, the yielding arm 148 separates from the fixed arm 147 to whatever extent is necessary, and the carriage on which the arms are mounted immediately begins a return movement. The rear end of the yielding arm 148 is caught momentarily by the rivet as it projects from the hole, said end eventually freeing itself as it is swung to diagonal position. After the rivet is headed, it is ejected from the hole and swept off the anvil by a resilient arm 202 mounted on the arm 148. Mechanism for ejecting the rivet from the hole in the anvil will now be described.

As previously stated, the anvil consists of a small plate 146 of hard metal. It is received within a cap 203, the latter being secured by screws 204 to a suitable base 205. A vertical reciprocal plunger 206 is mounted within said base 205 and is provided with an ejector pin 207 which fits within the opening 145. It is normally held in lowermost position by a spring 208 but is adapted to be elevated by means of a transverse latch 209. Said latch has a pair of ratchet teeth 210 on the upper face thereof which engage corresponding teeth 211 on the under surface of the plunger, whereby when said latch is moved to the rear (see Fig. 12) the plunger will be elevated. The latch 209 is normally impelled forwardly by means of a spring 212. The outer end of said latch is beveled at 213, whereupon it may engage a correspondingly beveled surface on a stop arm 214. Said stop arm is mounted on the traveling carriage 120, being pivoted on a pin 215 and yieldingly held against a stop 216 by means of a spring 217. As the carriage 120 moves to the left, the stop arm 214 engages the beveled end of the latch and moves it rearwardly, thereby raising the ejector pin and ejecting the rivet from the hole in the anvil. The stop arm 214 travels beyond the projecting end of the latch, and on its return movement rides over it by virtue of the yielding mounting described.

The heating circuit is controlled in part by a suitable switch mechanism mounted in a receptacle 220 at one end of the machine. The main shaft 2 passes through said receptacle and has mounted thereon a sleeve 221 compelled by a yieldingly held pin 222 to turn with said shaft when it rotates in one direction, but not in the other if obstructed. The sleeve has an arc-shaped cam 223 projecting therefrom. A similarly mounted cam 224 is spaced from the first cam on said sleeve. As the shaft turns in the direction indicated by the arrow, the cam 223 engages a projection 225, which latter, by means of insulation 226, is mounted on a resilient strip 227. Said strip carries a contact 228 at its free end. The other end is secured to a member 229, which latter is mounted on an insulating frame 230 having a lateral arm 231 projecting therefrom. When the projection 225 is engaged by the beveled front end of the cam 223, the contact 228 is pressed against a stationary contact 232, thereby closing the circuit at this point. In a similar manner the cam 224 engages a projection 233 mounted on, but insulated from, the metal strip 234, the latter being secured to a conducting member 235 at one end and carrying a contact 236 at its other end. Said contact 236 is normally in contact with the stationary contact 232 but is moved out of contact therewith whenever the front end of the rotating cam 224 engages the projection 233. The contact strip 234 is mounted on a frame of insulating material 237 having a lateral projection 238. A screw-threaded spindle 239 passes through the arm 231, 238, said spindle being reversely threaded at these points whereby rotation thereof will cause said arms to approach or recede from each other. The spindle is mounted in an opening in the support 240 and secured against longitudinal movement by collars 241. It is rotated by a knurled head 242. The insulating frames 230, 237 are guided in their back and forth movement by suitable guides 243 and secured against movement by a screw 244. The effect of this adjustment is to displace the projections 225, 233 longitudinally with respect to each other, whereby they are engaged by the rotating contacts at different relative parts of the rotation thereof. The sequence of operations is such that the contact 236 is first moved away from the stationary contact 232 and immediately thereafter the contact 228 is moved against said stationary contact. However, the circuit is not closed until contact 236 is allowed to snap back against the stationary contact, almost immediately after which the contact 228 is permitted to spring away from said stationary contact. The circuit is thus closed for a very short interval of time, due to the fact that the welding is effected very quickly. With the arrangements disclosed, the interval during which the circuit is closed may be adjusted within close limits by rotating the knurled head.

Figure 13:
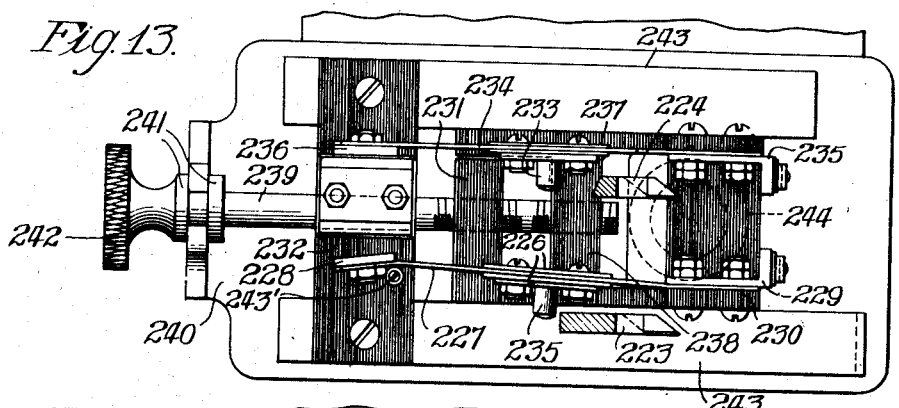
Fig. 13 is a plan of the switch mechanism with the actuating parts in section.
Figure 14:
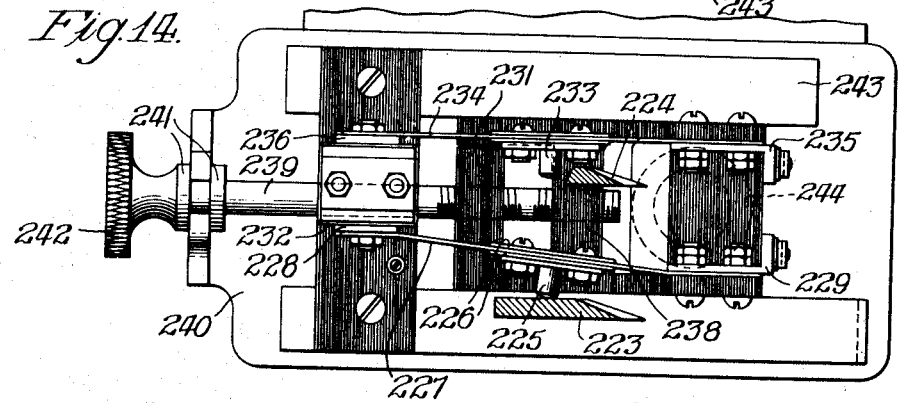
Fig. 14 is a similar plan view with the actuating parts in a different relative position.
Figure 15:
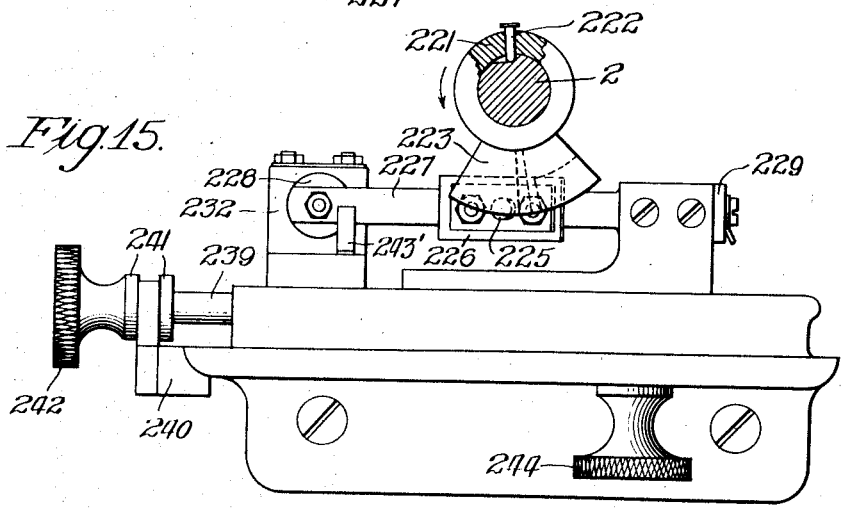
Fig. 15 is a side elevation of the switch mechanism.

The circuit diagram is shown in Fig. 16. The current is supplied by a three-wire system having mains 245, 246, 247. Suitable fuses 248 are provided between the outside circuit and the terminals 249. A three-pole switch 250 is included in the circuit to control the induction motor 251 corresponding to the motor 3 in the remaining sheets of the drawings. A pair of conductors 252 lead from the three-pole switch to a transformer switch 253, from which said conductors extend to terminals 254, one of which is connected directly to the primary windings 255 of the transformer. The other conductor has connected in series therewith a switch 256 for controlling the circuit of said primary, said switch being the one the mechanical features of which are illustrated in Figs. 13, 14, 15. The circuit leads from said switch to a suitable selector switch 257 consisting of a pivoted arm 258 and a series of contacts 259, connected by conductors 260 to the turns of the primary in such manner as to vary the number of turns in series, thereby regulating the amount of energy consumed during the welding operation. The secondary 261 is illustrated diagrammatically as being connected to the welding terminals 262, 263.

The selector switch 257 is mounted preferably in the base of the machine, as shown in Fig. 9. It is controlled by the operator by means of a knurled knob 264. The transformer 265 is also mounted in the base of the machine. The conductors 266, 267 lead therefrom to the bus bars 43, 44 previously mentioned. The motor switch is controlled by the operator through a suitable switch 268 at the front of the machine, and the transformer switch is controlled from a similar switch 269. Various conduits 270, 271, 272 and 273 are provided within which are located the various conductors necessary to connect up the different parts of the circuit. The transformer, the various switches and the conductors are of standard construction and need not be described herein.

The machine runs continuously when in operation, although for the purpose of running it intermittently when making the trial runs or adjustment, a suitable clutch may be provided, controlled, for example, by a pivoted lever 275. (See Figs. 1 and 2.) The beveled free end 276 of said lever is engaged by a curved spring 277 when the main shaft completes one rotation, thereby withdrawing a pin 278 and unlocking the collar 279 on the main shaft from the continuously rotating gear 9, whereby the machine is stopped until the operator moves the lever 275 out of engagement with said spring.

The operation of the machine may be briefly summarized as follows: The platinum and German silver wires are brought together by the two chucks and the welding current is applied momentarily by the switch operated by the main shaft. During the welding operation, the German silver wire is held adjacent to the weld by the copper clamps. The platinum wire is thereafter cut off by the nippers and the German silver wire, released by the copper clamps, is drawn downwardly below said clamps and then sheared off and moved by the carriage to the anvil where it is headed by two successive operations. It is than ejected from the anvil and swept aside into a suitable receptacle. While the heading operation is taking place, a welding operation is taking place simultaneously, forming a composite bar which is thereafter headed. The machine, therefore, operates at maximum capacity, since neither the heading mechanism nor the welding mechanism is idle during the operation of the other. As previously stated, it is not desirable in all cases to form a head out of the platinum tip, in which case the heading operation is omitted entirely.

It will be understood that the process may be carried out by machines other than the one described herein and that the process described may be deviated from in certain respects within the limits of the appended claims.

What is claimed is:

1. The process of making a composite metallic article, which consists in welding the abutting ends of two wires to each other, and then forming one of said parts into a desired shape.

2. The process of making a composite metallic article, which consists in welding to each other the abutting ends of two wires composed of different metals, then cutting said wires to a desired length, and finally forming one of said wires into a desired shape.

3. The process of making electrical contacts, which consists in welding to each other the abutting ends of two fine flexible wires composed of different metals, and then forming said parts so as to construct an article which will have a head and a shank.

4. The process of making composite electrical contacts which consists in welding the abutting ends of two wires to each other, cutting one of said wires so as to form a supporting shank and cutting the other of said wires so as to provide said shank with a tip of the desired contact material.

5. The process of making composite rivets or studs, which consists in welding the end of a platinum wire to the end of a support forming wire, cutting the latter so as to leave a supporting shank, cutting the platinum wire so as to leave a tip on said shank, holding said shank with said tip projecting and upsetting said tip to form a head.

6. The process of making electrical contacts which consists in gripping two wires over a substantial area near their respective ends, bringing said ends to reinforce said wires mechanically and provide ample electrical contact area together, passing a welding current therethrough and cutting off one of said wires adjacent to the said weld to form a contact tip for the other wire.

7. The process of making electrical contacts which consists in feeding the end of a wire through an opening in a die, welding another wire to said first wire end to end, cutting off the second wire adjacent to the welded joint and moving the projecting portion of said first wire laterally with respect to said die opening to shear off said portion and remove it.

8. The process of making electrical contacts which consists in feeding the end of a wire through an opening in a die, welding another wire to said first wire end to end, cutting off the second wire adjacent to the welded joint, moving said first wire in said opening to adjust the length of the projecting end and shearing off said end by a lateral movement thereof with respect to said die.

9. The process of making electrical contacts which consists in feeding the end of a wire through an opening in a die, welding another wire to said first wire end to end, cutting off the second wire adjacent to the welded joint, moving said first wire in said opening to adjust the length of the projecting end, shearing off said end by a lateral movement and heading said sheared portion by pressure applied to an end thereof.

10. The process of making electrical contacts which consists in gripping two wires adjacent their respective ends, passing the end of one of said wires through an opening in a plate, bringing the ends of said wires together, making electrical contact with one of said wires between its end and the gripped portion, completing a circuit through the other of said wires, pressing the ends of said wires together to unite them, shearing the said other wire adjacent to said weld, drawing the projecting portion of said remaining composite wire through said plate to shorten said portion and forcing said portion laterally to shear off a predetermined length.

11. The process of making electrical contacts which consists in gripping two wires adjacent their respective ends, passing the end of one of said wires through an opening in a plate, bringing the ends of said wires together, making electrical contact with one of said wires between its end and the gripped portion, completing a circuit through the other of said wires, pressing the ends of said wires together to unite them, shearing the said other wire adjacent to said weld, drawing the projecting portion of said remaining composite wire through said plate to shorten said portion, forcing said portion laterally to shear off a predetermined length and upsetting one end of said composite wire to form a head.

12. The process of making a composite metallic article which consists in welding to each other the abutting ends of two wires composed of different metals, shearing off a predetermined length of said welded wires by a lateral movement and heading said sheared length by pressure applied to an end thereof.

13. The process of forming electrical contacts which consists in gripping two wires adjacent to their ends, pressing said ends together, clamping the projecting end of one of said wires, supplying a welding current to said wires between the clamped portion of one wire and the gripped portion of the other wire, increasing the projecting length of said other wire, cutting off said other wire close to said weld, releasing said clamping member, decreasing the projecting length of said first wire and shearing off the latter.

14. The process of forming electrical contacts which consists in gripping two wires adjacent to their ends, pressing said ends together, clamping the projecting end of one of said wires, supplying a welding current to said wires between the clamped portion of one wire and the gripped portion of the other wire, increasing the projecting length of said other wire, cutting off said other wire close to said weld, releasing said clamping member, decreasing the projecting length of said first wire, shearing off the latter by a side movement to remove it and moving said sheared ends into contact with each other to repeat the operation.

15. The process of making electrical contacts, which consists in gripping two flexible wires near their ends, bringing said ends together, passing a welding current therethrough, and cutting off the ends of each wire between the gripped portions leaving two projecting ends.

16. The process of making electrical contacts, which consists in gripping two flexible wires near their ends, bringing said ends together, passing a welding current therethrough, cutting off the ends of each wire between the gripped portions leaving two projecting ends, and subsequently welding said projecting ends to each other and cutting off the same to form duplicate contacts.

17. The process of forming electrical contacts, which consists in gripping two wires adjacent their ends with said ends in contact, passing a welding current through said contacting ends, cutting off each wire between said gripping means leaving two projecting ends, causing said projecting ends to contact with each other, and repeating said cycle of operations to form additional contacts.

In witness whereof, I hereunto subscribe my name this 14th day of March A. D., 1917.

WILLIAM F. HOSFORD.